(No Model.) 3 Sheets—Sheet 1.

G. H. BABCOCK, S. WILCOX & N. W. PRATT.
COMPOUND STEAM ENGINE.

No. 249,446. Patented Nov. 15, 1881.

Witnesses:
W. Colborne Brookes
W. C. Dey

Inventors.
G. H. Babcock
S. Wilcox
N. W. Pratt
their attorney
J. D. Stetson (No Model.) 3 Sheets—Sheet 2.

G. H. BABCOCK, S. WILCOX & N. W. PRATT.
COMPOUND STEAM ENGINE.

No. 249,446. Patented Nov. 15, 1881.

Witnesses:
W. Colborne Brookes
W. C. Dey

Inventors
George H. Babcock,
Stephen Wilcox,
Nathaniel W. Pratt,
by their attorney
Thomas D. Stetson

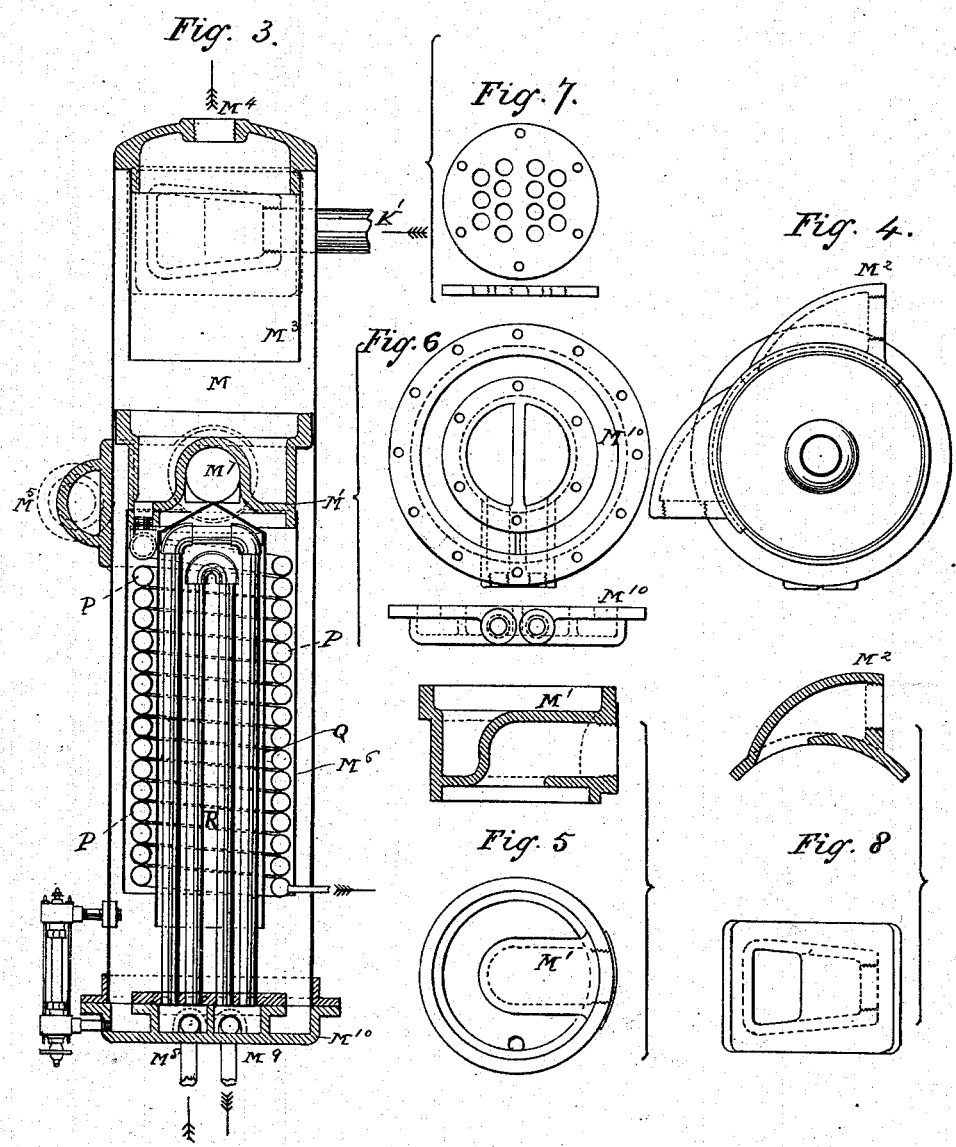

UNITED STATES PATENT OFFICE.

GEORGE H. BABCOCK, OF PLAINFIELD, NEW JERSEY, AND STEPHEN WILCOX AND NATHANIEL W. PRATT, OF BROOKLYN, NEW YORK; SAID PRATT ASSIGNOR TO SAID BABCOCK AND WILCOX.

COMPOUND STEAM-ENGINE.

SPECIFICATION forming part of Letters Patent No. 249,446, dated November 15, 1881.

Application filed April 19, 1881. (No model.)

*To all whom it may concern:*

Be it known that we, GEORGE H. BABCOCK, a citizen of the United States, residing at Plainfield, Union county, in the State of New Jersey, STEPHEN WILCOX, a citizen of the United States, residing in Brooklyn, Kings county, in the State of New York, and NATHANIEL W. PRATT, a citizen of the United States, also residing in Brooklyn, aforesaid, have invented certain new and useful Improvements relating to Compound Steam-Engines, of which the following is a specification.

The accompanying drawings form a part of this specification, and represent what we consider the best means of carrying out the invention.

Figure 1:
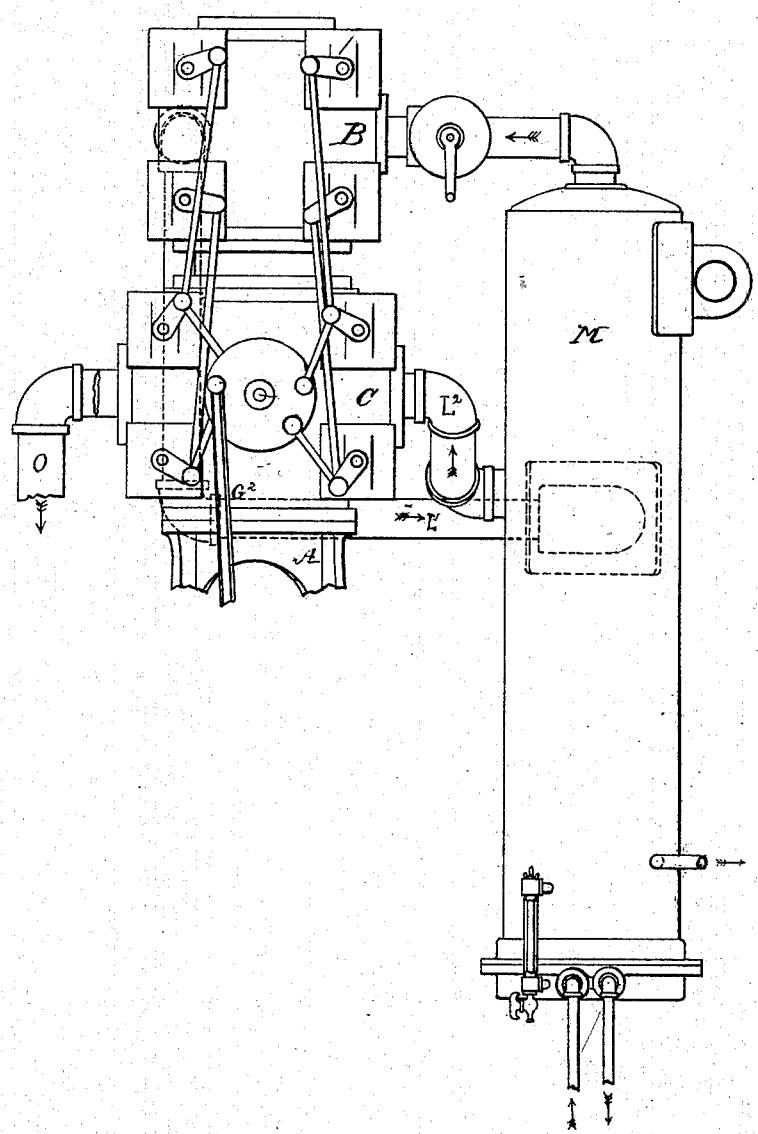
Figure 2:
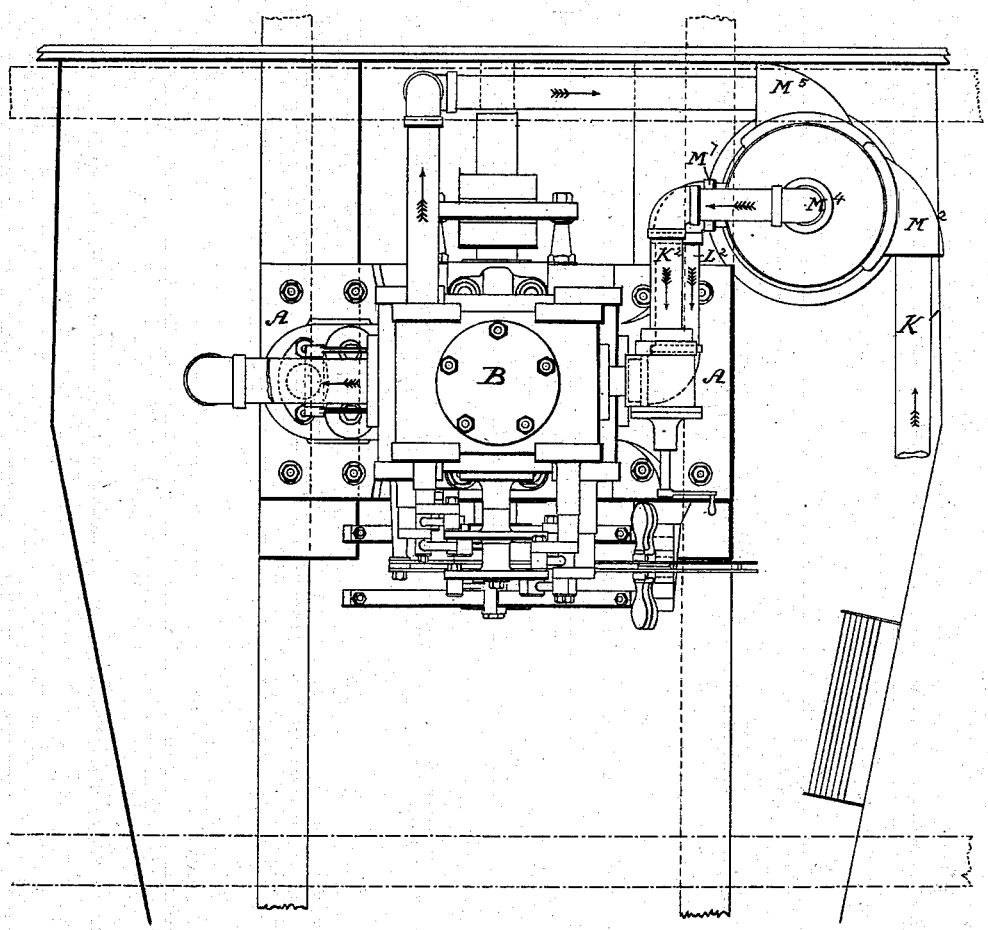

Figure 1 is a face view of the cylinders of the engine, with an elevation of the separator-vessel. Fig. 2 is a plan view of the entire apparatus. Fig. 3 is a central vertical section through an important member, which I term the "separator." Fig. 4 is a plan view thereof. Fig. 5 is a vertical section and a plan view of the horizontal partition at the mid-height in the separator. Fig. 6 is a plan view and an elevation of the bottom pate of the separator. Fig. 7 is a plan view and an elevation of the tube-plate, in which the feed-pipes are set to be attached to the bottom plate. Fig. 8 is a horizontal section and an inside view of one of the tangential nozzles detached.

Similar letters of reference indicate like parts in all the figures.

A is the fixed frame-work of the engine; B, the upper cylinder; C, the lower cylinder.

Piston-rods and engine-shaft are provided to operate the device, and a means is employed to regulate and govern the valves.

M is an upright cylindrical vessel standing near the engine, and preferably supported on the same bed-plate. It is divided horizontally by an irregular-shaped partition, M', into an upper and lower chamber. The upper chamber contains steam at full boiler-pressure. The lower chamber contains steam at the lower pressure which obtains between the high-pressure and low-pressure cylinders. The steam from the boiler is received through the pipe K' into the tangential nozzle $M^2$, and is caused to whirl around in a small space between the outer shell and a cylindrical curtain, $M^3$, of smaller diameter than the main shell, and extending down concentrically within it to near the bottom of the upper chamber. The steam, in whirling around in this chamber, throws all its water against the interior of the shell M, on which surface it trickles down and gathers in the bottom, while the steam having parted with its water moves inward near the bottom and rises within the curtain $M^3$ and passes out through the nozzle $M^4$ into the pipe $K^2$ at substantially the same pressure but in a drier condition than before, to be used in the upper cylinder, B.

The steam is worked expansively, and on escaping through the exhaust-valves of the upper cylinder, B, flows through the pipe L' and enters through the lower tangential nozzle, $M^5$, into the lower chamber of the vessel M. In this lower chamber it is again whirled around, parting with its water, by depositing it in the interior of the shell, and, passing inward under the curtain $M^6$, it rises in the interior of the lower chamber and escapes through a nozzle, $M^7$, immediately under the partition M', and flows through a pipe, $L^2$, to the lower cylinder, C, where it is again used and expanded down after the fashion of other compound engines. It is finally discharged through the pipe O into the condenser, which in the figure is understood to be a pipe or chamber presenting a suitable surface mounted in or under the bottom of the vessel. The condenser is prevented from becoming choked by the action of the air-pump, as will be understood.

To the base of the upper chamber is attached a pipe coiled as indicated by P. Through this pipe the water separated from the steam at full pressure in the chamber above descends, imparting heat to the steam, which is at a lower pressure, and consequently at a lower temperature, in the chamber below. The steam at moderate pressure and temperature is prepared for use in the lower cylinder, C, by first parting with the water produced by its cooling and expansion in the first cylinder, and then is carried upward past the many coils of the hotter pipe P, thus becoming effectually dried and slightly superheated. The water is allowed to escape from the bottom of the hot coil P through a trap, (not represented,) discharging into the space where the steam is at a lower pressure in the lower part of M. In this space, subjected to a lower pressure, it contributes its remaining heat to the quantity of steam for use in the second cylinder. The water is trapped out from the lower chamber of the vessel M through another trap into the hot-well.

Q is a case partially covering a series of pipes, R, and preventing said pipes from exercising any refrigerating influence on the current of weak steam passing up between this case Q and the curtain $M^6$. The pipes R contain the feed-water, which, it will be understood, may be received from any suitable source at any temperature, and driven by a feed-pump, (not represented,) entering the base of the vessel M through a nozzle, $M^8$, circulating through the pipes P, and being led away through the nozzle $M^9$ to a pipe (not represented) to supply the boiler. The heat which is imparted to the feed-water is taken from the weak steam in the lower portion of the vessel M. The heating of the feed-water condenses a portion of such steam, and contributes largely to the water which is trapped out from the lower portion of said case. It diminishes the quantity of low-pressure steam which is available for use in the lower cylinder, C, and thus diminishes somewhat the power of the compound engine; but we find the gain by the heating of the feed-water to be much greater than the slight loss thus incurred.

We can, if preferred in any case, instead of trapping the water from the pipe P into the lower part of the separator-case M, trap it into the hot-well, (not represented;) but we prefer the arrangement first described for the reason, among others, that it allows the heat and steam given off therefrom, when subjected to the lower pressure, to be utilized in the lower cylinder.

The compound engine may be constructed with the cylinders side by side, and with pistons mounted on separate piston-rods with suitable connections; but we prefer the arrangement shown.

Modifications may be made in the form and proportions of the details.

It will be understood that the vessels may be clothed in felt or other suitable non-conductor to economize the heat.

The plate $M^{10}$, in which are set the feed heating-pipes R, is removable to facilitate the withdrawal of these parts for examination or repairs. In using some kinds of water these pipes will require cleaning or exchanging at intervals, by reason of their accumulating carbonate of lime or other foreign matter.

Some of the advantages due to certain features of the invention may be separately enumerated, as follows:

First. By reason of the tangential position of the pipe $K'$, and of the hanging curtain $M^3$ extending down in the position represented within the upper portion of the separator M, we are able to whirl the steam rapidly and thoroughly in the concentric space between the curtain and the exterior, thereby throwing off the dense water to the outer surface, where it trickles down, and to take the dry steam inward under the lower edge of the curtain and carry it upward to be taken away through the passages $K^2$, and to discharge it in a dry condition, while by the arrangement of this entire chamber in the top of the separating-vessel the space is utilized, and the water trickling down is favorably situated for imparting its heat to the steam at lower pressure, which is to be whirled below.

Second. By reason of the pipes $L'$ $L^2$, the lower chamber of the separator M being interposed in the passage of the steam from the high-pressure cylinder B to the low-pressure cylinder C, and of the curtain $M^6$, arranged therein, as shown, we insure the mechanical removal of the water produced by condensation and leave the steam in favorable condition either for direct use in the low-pressure cylinder, or for being economically dried or superheated previous to such use.

Third. By reason of the pipe P, arranged as shown, we are able to utilize the heat in the water being trapped out of the upper chamber, and also to act with much advantage by the heat of the steam at full pressure which follows such water and fills a large portion of such pipe. The heat from both sources is presented favorably for the evaporation of the last particles of moisture in the low-pressure steam, and such steam is thereby prepared for more than usually economical use in the large cylinder C.

Fourth. By reason of the feed-pipes R, arranged as shown, we are able to heat the feed-water at the expense of a portion of the low-pressure steam between the high-pressure and low-pressure cylinders without appreciably affecting the dryness of the steam delivered to the second cylinder.

We claim as our invention—

1. The pipes $K'$ $K^2$, separator M, and internal hanging curtain, $M^3$, combined and adapted to serve between an engine and boiler, as herein specified.

2. The pipes $L'$ and $L^2$, in combination with the lower chamber of the separator M, having the hanging curtain $M^6$, and with the cylinders B C of a compound engine, combined as herein specified.

3. The coiled pipe P, in combination with the separator M, horizontal partition $M'$, pipes $K'$ $K^2$, curtain $M^3$, pipes $L'$ $L^2$, and curtain $M^6$, with provisions for discharging the water from both the upper and lower parts of the separator M, as herein specified.

4. The separator M, having the horizontal partition M', pipes K' K² L' L², curtains M³ M⁶, shield Q, and one or more feed-pipes R, combined as herein specified.

In testimony whereof we have hereunto set our hands, at New York city, this 8th day of June, 1880, in the presence of two subscribing witnesses.

GEO. H. BABCOCK.
STEPHEN WILCOX.
NAT. W. PRATT.

Witnesses:
W. COLBORNE BROOKES,
W. L. BENNEM.